United States Patent
Ito

[11] 4,099,847
[45] Jul. 11, 1978

[54] ZOOM LENS SYSTEM CAPABLE OF CLOSE-UP PHOTOGRAPHY

[75] Inventor: Yukio Ito, Suwa, Japan

[73] Assignee: Nitto Kogaku Kabushiki Kaisha, Japan

[21] Appl. No.: 720,272

[22] Filed: Sep. 3, 1976

[30] Foreign Application Priority Data

Sep. 8, 1975 [JP] Japan .................. 50-108674

[51] Int. Cl.² .................................... G02B 15/18
[52] U.S. Cl. ................................................ 350/187
[58] Field of Search ................... 350/186, 187, 184

[56] References Cited

U.S. PATENT DOCUMENTS

| 3,661,445 | 5/1972 | Someya | 350/186 |
| 3,784,285 | 1/1974 | Watanabe et al. | 350/186 X |
| 3,817,600 | 6/1974 | Watanabe et al. | 350/186 |
| 3,992,084 | 11/1976 | Nakamura | 350/186 |

*Primary Examiner*—Paul A. Sacher
*Attorney, Agent, or Firm*—Stevens, Davis, Miller & Mosher

[57] ABSTRACT

Variable power lenses and correcting lenses are integrally moved a prescribed distance toward an object to be photographed without changing a spacing maintained between the two lens groups in ordinary photography, so as to attain the state capable of close-up photography. Said variable lenses and said correcting lenses are caused to perform zooming movement for adjusting the focus for close-up photography.

A cam cylinder for moving said variable power lenses and said correcting lenses while keeping a spacing maintained between the two lens groups in ordinary photography is disposed so that said variable power lenses and said correcting lenses are moved linearly a prescribed length in the direction of the optical axis integrally with said cam cylinder toward an object to be photographed without changing the spacing between the two lens groups, so as to attain the state capable of close-up photography. By rotation of said cam cylinder, said variable power lenses and said correcting lenses are caused to perform zooming movement for adjusting the focus for close-up photography.

1 Claim, 6 Drawing Figures

ZOOM LENS SYSTEM CAPABLE OF CLOSE-UP PHOTOGRAPHY

BACKGROUND OF THE INVENTION

The present invention relates to an ordinary zoom lens system capable of close-up photography.

Many zoom lens optical systems capable of close-up photography comprising focusing lenses, correcting lenses, and fixed lenses are known in the art. In one of these known zoom lens systems, either of a group of variable power lenses and a group of correcting lenses is fixed but the other lens group is moved so that a certain relationship of between the two lens groups maintained in an ordinary zoom lens optical system is changed in attaining the state capable of close-up photography.

According to another known method, the lens spacing between variable power lenses and correcting lenses in an ordinary zoom lens system is changed in advance and when zooming is performed the picture point is shifted, whereby a state capable of close-up photography is attained.

In performing such operations in the zoom optical system, in order to change a relationship of the spacing between variable power lenses and correcting lenses which is maintained in case of ordinary photography, a cam cylinder having a cam groove formed therein for moving the two groups of lenses is divided into two portions, or the length of the cam groove is extended beyond the ordinary movement range. However, such arrangements involves various technical problems and difficulties. For example, the precision is reduced by division of the cam cylinder into two portions, and an additional space must be considered for extending the cam groove and designing becomes difficult because of such extension of the cam groove.

It is therefore a primary object of the present invention to provide a zoom lens system in which the foregoing defects involved in the conventional techniques are eliminated, by providing a zoom lens system in which in the case of close-up photography, as well as in the case of ordinary photography, variable power lenses and correcting lenses can be moved without changing a spacing maintained between the two lens groups in ordinary photography, and in which these two lens groups can be integrally moved by a prescribed length toward an object to be photographed with respect to focusing lenses and fixed lenses while keeping a constant spacing maintained between the two lens groups, and wherein close-up photography is made possible by the zooming operation used in ordinary photography.

The present invention will now be described in detail by reference to embodiments illustrated in the accompanying drawings.

BRIEF DESCRIPTION OF THE DRAWINGS

The drawings illustrate embodiments of the zoom lens system of the present invention, in which.

DETAILED DESCRIPTION OF THE DRAWINGS

Figure 1:
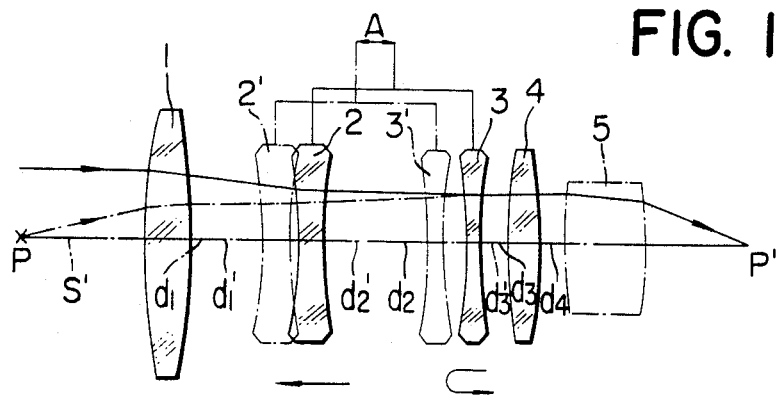
FIG. 1 shows changeover from ordinary photography to close-up photography in a zoom lens optical system including negative correcting lenses and positive fixed lenses.
Figure 2:
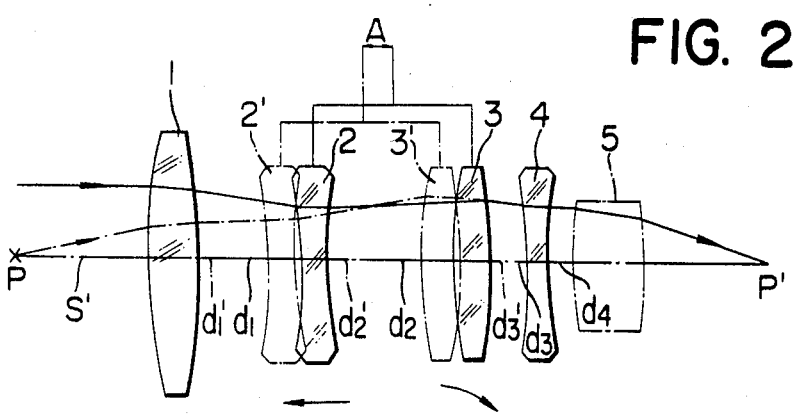
FIG. 2 shows changeover from ordinary photography to close-up photography in a zoom lens optical system including positive correcting lenses and negative fixed lenses.
Figure 6:
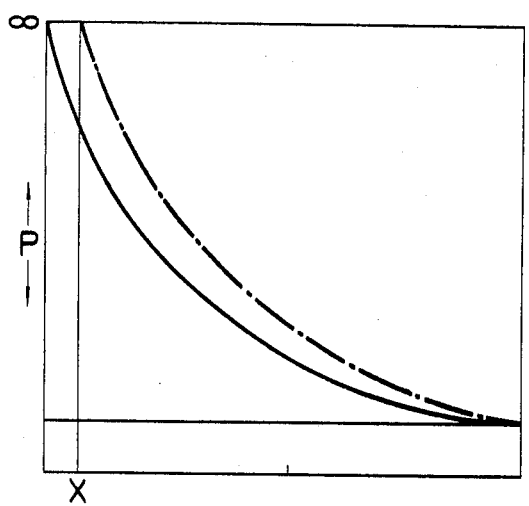
FIG. 6 is a graph showing the change of the distance to the image point (P) on the side of an object to be photographed in the case of close-up photography in Examples according to FIGS. 1 and 2, the solid line showing the change in the Example according to FIG. 1 and the chain line showing the change in the Example according to FIG. 2.

FIGS. 1 and 2 illustrate a zoom lens optical system, in which reference numerals 1, 4 and 5 denote focusing lenses, positive or negative fixed lenses and master lenses, respectively. In the case where fixed lenses 4 are positive lenses as shown in FIG. 1, the positive fixed lenses 4 and the master lenses 5 may be regarded as being identical with each other with respect to function.

Negative variable power lenses 2, for performing zooming, and negative or positive correcting lenses 3 are disposed between the focusing lenses 1 and the fixed lenses 4 so that the spacing between lenses 2 and 3 is varied according to prescribed relationship so that ordinary zoom photography is accomplished.

When close-up photography is carried out according to the present invention, the variable lenses 2 and the correcting lenses 3 are integrally moved by a prescribed length A toward an object to be photographed with respect to the focusing lenses 1 and the fixed lenses 4 without changing the above spacing maintained between the two lens groups 2 and 3 in ordinary photography, and adjustment of the focus for close-up photography is performed by zooming movement of the shifted variable lenses 2' and correcting lenses 3'.

Examples of the basic lens arrangement in the present invention will now be described.

EXAMPLE I (according to FIG. 1)

f = 10.00 − 18.37 − 47.78 (focal distance of the total system)

$A = 2.45$

| | fi | Wide-angle lens | Intermediate lens | Telephoto lens |
|---|---|---|---|---|
| Lens group 1 | 72.24 | | | |
| d1 | | 18.01 | 32.46 | 47.30 |
| d2 | | 15.56 | 30.01 | 44.85 |
| Lens group 2 | −17.82 | | | |
| d2 (same as d2') | | 35.56 | 17.98 | 7.99 |
| Lens group 3 | −58.98 | | | |
| d3 | | 6.57 | 9.70 | 4.85 |
| d3' | | 9.02 | 12.15 | 7.30 |
| Lens group | 36.86 | | | |

|  | fi | Wide-angle lens | Intermediate lens | Telephoto lens |
|---|---|---|---|---|
| 4 |  |  |  |  |
| d4 |  | 39.16 | 39.16 | 39.16 |
| Lens group 5 | 21.38 |  |  |  |
| S' |  | 58.3 | 286.1 | ∞ |

In the above table, $fi$ denotes the focal distance of each lens group, each of $d1$ to $d4$ denotes the principal point distances of the lens group in case of ordinary photography, each of $d1'$ to $d3'$ denotes the principal point distances in case of close-up photography, and $S'$ denotes the distance between the principal point of the lens group 1 and the image point P on the side of an object to be photographed.

EXAMPLE 2 (according to FIG. 2)

$f = 10.00 - 29.00 - 42.30 - 56.45$ (focal distance of the total system)
$A = 1.51$

|  | fi | Wide-angle lens | Inter-mediate lens | X | Tele-photo lens |
|---|---|---|---|---|---|
| Lens group 1 | 50.35 |  |  |  |  |
| d1 |  | 7.55 | 20.20 | 23.23 | 25.18 |
| d1' |  | 6.04 | 18.69 | 21.72 | 23.67 |
| Lens group 2 | −13.61 |  |  |  |  |
| d2 (same as d2') |  | 33.46 | 14.81 | 8.86 | 4.28 |
| Lens group 3 | 18.14 |  |  |  |  |
| d3 |  | 6.68 | 12.68 | 15.60 | 18.23 |
| d3' |  | 8.19 | 14.19 | 17.11 | 19.74 |
| Lens group 4 | −20.80 |  |  |  |  |
| d4 |  | 9.40 | 9.40 | 9.40 | 9.40 |
| Lens group 5 | 17.22 |  |  |  |  |
| S' |  | 69.8 | 1360 | ∞ | — |

In the foregoing Examples, each of the optical systems including lens groups 1 to 4 is an afocal system. Similar effects can be obtained even if the optical system is not an afocal system. Further, even if powers of the respective lens groups are different from those specifically illustrated in the foregoing Examples, similar effects can be obtained, so far as the lens group 1 consists of focusing lenses, the lens group 2 consists of negative variable lenses, the lens group 3 consists of negative or positive correcting lenses and the lens group 4 consists of positive or negative fixed lenses. Furthermore, even if the length of the integral movement of the variable power lenses 2 and the correcting lenses 3 is set to an optional value different from the values specifically illustrated in the foregoing Examples, similar effects can be obtained.

In the zoom lens optical system of the present invention having the above structure, even in the case of close-up photography, both lens groups 2 and 3 can be moved without changing the spacing maintained in ordinary zoom photography, and therefore, the structure of the lens shifting mechanism can be remarkably simplified over the conventional systems and a higher precision can be attained with economical advantages.

Embodiments of the mechanism of the zoom lens system of the present invention will now be described by reference to FIGS. 3, 4 and 5.

Figure 3:
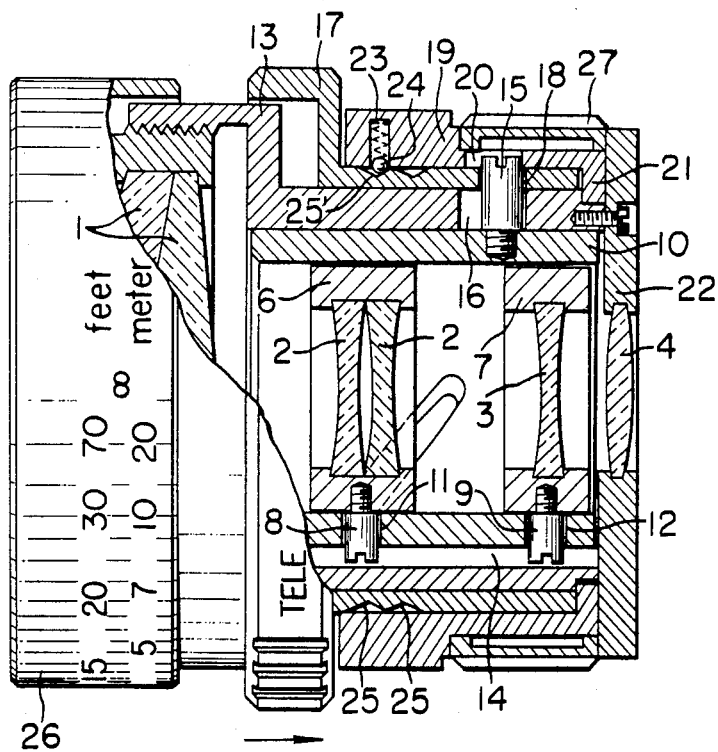
FIG. 3 is a partially cut-out side view illustrating the mechanism of the optical system shown in FIG. 1 in the state of ordinary photography.

Referring to FIG. 3, pins 8 and 9 formed on lens-barrels 6 and 7 of variable power lenses 2 and correcting lenses 3 are engaged with cam grooves 11 12 of a cam cylinder 10 and a linear groove 14 of a main lens-barrel 13 which extends in the direction of the optical axis.

A pin 15 formed on the cam cylinder 10 penetrates through an elongated hole 16 of the main lens-barrel 13 and is engaged with a hole 18 of a zoom ring 17 and an elongated hole 20 of an outer cylinder 19.

A flange 21 of the outer cylinder 19 is fitted to a clearance between the main lens-barrel 13 and a seat plate 22 fixed to said main lens-barrel, so that the flange 21 is not moved in the direction of the optical axis but is movable in the direction of rotation.

Figure 4:
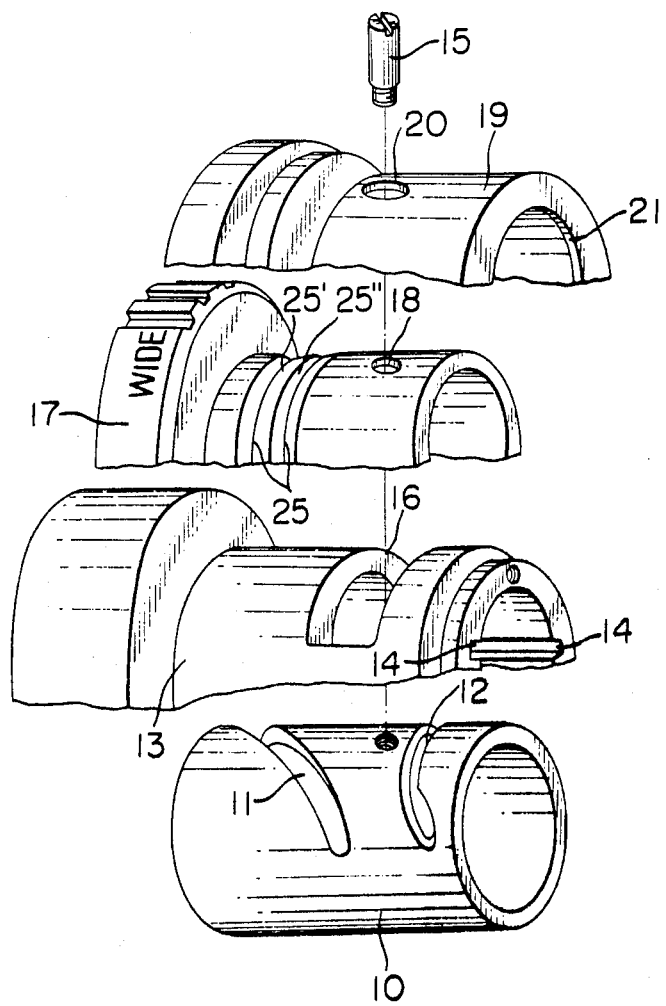
FIG. 4 is a cubic perspective view illustrating the main parts of the mechanism for moving the cam cylinder of the optical system, which is shown in FIGS. 3 and 5.

The main part of the above embodiment of the present invention is illustrated in more detail in a cubic perspective view as shown in FIG. 4. The pin 15 formed on the cam cylinder 10 is exactly engaged with the hole 18 of the zoom ring 17 and is also engaged with the elongated hole 20 of the outer cylinder 19 so that the pin 15 is allowed to slide in the direction of the optical axis along the width of the elongated hole 20 but it is not allowed to move in the circumferential direction.

The elongated hole 16 of the main lens-barrel 13 has, in connection with the circumferential direction, a peripheral movement angle necessary for performing zooming by turning the zoom ring 17 and it also has, in connection with the direction of the optical axis, a space greater than the width along which the pin 15 is allowed to slide in the elongated hole 20 of the outer cylinder 19 in the direction of the optical axis.

In the above arrangement (see FIG. 3 as well as FIG. 4), when the zoom ring 17 is moved in the direction of the optical axis, the pin 15 is moved through a distance corresponding to the width of the hole 20 of the outer cylinder 19. Further, since the flange 21 of the outer cylinder 19 is fixed to the clearance between the main lens-barrel 13 and the seat plate 22, the cam cylinder 10 is moved with respect to the main lens-barrel 13 by a distance corresponding to the width of the hole 20 of the outer cylinder 19.

Since the positions of the lens-barrels 6 and 7 in the cam grooves 11 and 12 are controlled by the pins 8 and 9, when the pins 8 and 9 slide in the linear groove 14 of the main lens-barrel 13, the lens-barrels 6 and 7 are shifted integrally with the cam cylinder 10.

In the state of ordinary photography illustrated in FIG. 3, when the zoom ring 17 is pressed and moved toward the picture side (in the direction indicated by an arrow), the pin 15 strikes the picture side end face of the hole 20 of the outer cylinder 19, and a zoom optical system for ordinary photography is formed.

In this state, a click ball 24 imposes a pressing force only between the outer cylinder 19 and the zoom ring 17, and therefore, the force of the above zooming operation is not influenced by the pressing force of the click ball 24 and the zooming operation is accomplished very smoothly.

Figure 5:
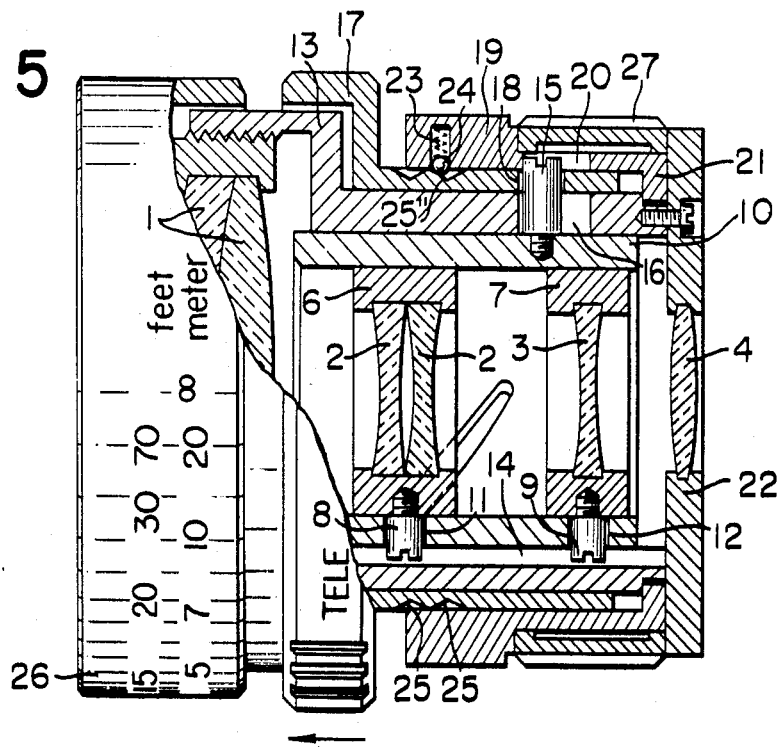
FIG. 5 is a partially cut-out side view illustrating the same mechanism in the state of close-up photography.

The state of close-up photography is illustrated in FIG. 5. The zoom ring 17 is drawn out toward the side of an object to be photographed (in the direction indicated by an arrow), and the pin 15 strikes the end portion, on the side of the object to be photographed, of the hole 20 of the outer cylinder 19 and the pins 8 and 9 of the variable lenses 2 and correcting lenses 3 are linearly moved toward the object to be photographed in the linear groove 14 by a length A (as shown in FIGS. 1 and 2), whereby the state capable of close-up photography is attained.

In this case, the click ball 24 is pressed into a V-shaped inclined face 25″ of a click groove 25 on the picture side of the zoom ring 17 to thereby prevent the pin 15, i.e., the cam cylinder 15, from returning toward the picture side.

The adjustment of the focal length for close-up photography is performed by turning the zoom ring 17 as in case of ordinary zoom photography.

As will be apparent from the foregoing illustration, the zoom lens system of the present invention is advantageous in various points over the conventional systems in which the prescribed relationship of the movement spacing between variable power lenses and correcting lenses maintained in ordinary photography is changed when close-up photography is conducted. For example, the state of the foregoing two moving lens groups of which the highest precision is required among lenses of the zoom lens system need not be changed when ordinary photography is changed over to close-up photography, and these moving lenses are integrally moved by a prescribed length with respect to the focusing lenses and fixed lenses. Accordingly, no error is caused. Further, since the above movement of the moving lenses is accomplished by using a cam cylinder and the adjustment of the focal length for close-up photography is accomplished by ordinary zoom movement, such troublesome arrangement as division of the cam cylinder into two portions or extension of the cam groove beyond the ordinary movement range, that is inevitably adopted in conventional systems for enabling close-up photography, need not be made at all in the present invention. Therefore, the structure can be remarkably simplified over the conventional systems and a higher precision can be attained. Moreover, the zoom lens system capable of close-up photography according to the present invention is very advantageous from the economical viewpoint.

What is claimed is:

1. A zoom lens capable of close-up photography comprising a lens system including positive focusing lenses, negative variable power lenses, a negative correcting lens and a positive fixed lens or including positive focusing lenses, negative variable power lenses, a positive correcting lens, and a negative fixed lens, characterized by a main lens-barrel having a straight groove parallel to an optical axis thereof, a cam cylinder mounted in said main lens-barrel and having cam grooves formed therein, said variable power lenses and said correcting lens having respective lens-barrels mounted in said cam clyinder in spaced relation, pins extending from said lens-barrels through said cam grooves into said straight groove in said main lens-barrel, means for moving said cam cylinder between a rearward position for ordinary photography and a forward position for close-up photography, means for moving said variable power lenses and said correcting lens together along the optical axis without changing the space between said two lens groups, and means for rotating the cam cylinder to move said variable power lenses and said correcting lens toward and away from each other along the optical axis due to engagement of said pins with said cam and straight grooves, whereby adjustment of the focus for close-up photography can be made in the same way as in a zooming operation when the cam cylinder is in said forward position.

* * * * *